(12) United States Patent
Yin et al.

(10) Patent No.: US 9,232,860 B2
(45) Date of Patent: Jan. 12, 2016

(54) FOLDABLE LEG REST

(71) Applicant: Wan-Yu Li, Taipei (TW)

(72) Inventors: Qing-Kun Yin, Guangdong (CN); Chin-Chen Chang, Taipei (TW)

(73) Assignee: Wan-Yu Li, Taipei (TW)

( * ) Notice: Subject to any disclaimer, the term of this patent is extended or adjusted under 35 U.S.C. 154(b) by 155 days.

(21) Appl. No.: 14/137,244

(22) Filed: Dec. 20, 2013

(65) Prior Publication Data

US 2015/0021969 A1     Jan. 22, 2015

(30) Foreign Application Priority Data

Jul. 16, 2013  (CN) .......................... 2013 1 0296853

(51) Int. Cl.
*A47C 7/50* (2006.01)
*B64D 11/06* (2006.01)

(52) U.S. Cl.
CPC ............ *A47C 7/506* (2013.01); *B64D 11/0643* (2014.12)

(58) Field of Classification Search
CPC .......................... A47C 7/506; B64D 11/0643
USPC ....................................... 297/423.26, 423.28
See application file for complete search history.

(56) References Cited

U.S. PATENT DOCUMENTS

| | | | | |
|---|---|---|---|---|
| 5,507,562 | A * | 4/1996 | Wieland | A47C 7/506 297/423.26 |
| 7,866,755 | B2 * | 1/2011 | Okano | B60N 2/0232 297/423.26 |
| 8,926,009 | B1 * | 1/2015 | LaPointe | A47C 7/506 297/423.28 |
| 2009/0273220 | A1 | 11/2009 | Kim et al. | |
| 2013/0045825 | A1 | 2/2013 | Yin et al. | |
| 2013/0313882 | A1 * | 11/2013 | Yin | A47C 7/506 297/423.22 |

FOREIGN PATENT DOCUMENTS

| | | |
|---|---|---|
| CN | 202589862 U | 12/2012 |
| GB | 2502822 A1 | 12/2013 |
| JP | 2010246805 A | 11/2010 |

OTHER PUBLICATIONS

Search Report for the corresponding GB Patent Appln. No. 1313286.5 dated Jan. 24, 2014, 6 pages.

* cited by examiner

*Primary Examiner* — Anthony D Barfield
(74) *Attorney, Agent, or Firm* — C. G. Mersereau; Nikolai & Mersereau, P.A.

(57) ABSTRACT

A foldable leg rest has a seat, a first folding frame and a first stage drive mechanism. The first folding frame is pivotally connected to the seat. The first stage drive mechanism includes two angle adjusters, two first stage DC motors and a drive rod. Each of the angle adjusters is disposed between one of opposite sides of the seat and one of opposite sides of the first folding frame. The first stage DC motors are respectively disposed on the sides of the seat. The drive rod is connected between the angle adjusters. In use, the first stage DC motors are actuated to drive the drive rod and the angle adjusters such that the first folding frame is pivoted relative to the seat.

12 Claims, 18 Drawing Sheets

US 9,232,860 B2

FOLDABLE LEG REST

BACKGROUND OF THE INVENTION

1. Field of the Invention

The present invention relates generally to chairs, and more particularly to a foldable leg rest applied to a chair for supporting the legs of a sitter in a stretched position.

2. Description of the Related Art

Chairs allow people to sit thereon and support weights of sitters. A conventional chair substantially comprises a seat and a backrest for supporting the bottom and the back of a sitter. The backrest may be adjustable in angle relative to the seat by an angle adjuster to fit different needs of different sitters.

However, when a person sits on the conventional chair for a long time, for example, on a long vehicle trip, the legs of the sitter will become tired and numb, or feel pain due to long time of bending. Accordingly, the conventional chair should be further improved to provide an enhanced comfort for the sitter.

SUMMARY OF THE INVENTION

The present invention provides a foldable leg rest that supports the legs of a sitter in a stretched position.

A foldable leg rest in accordance with the present invention comprises a seat, a first folding frame and a first stage drive mechanism. The seat includes a front end. The first folding frame includes a rear end and a bottom surface. Two opposite sides of the rear end of the first folding frame are pivotally connected to two opposite sides of the front end of the seat by the first stage drive mechanism. The first stage drive mechanism includes two angle adjusters, two first stage DC motors and a drive rod. Each of the angle adjusters is disposed between one of the sides of the front end of the seat and one of the sides of the rear end of the first folding frame. Each angle adjuster has a retaining member, an angle adjustment plate and a pivot member. The retaining member has a fixed part and a mounting plate. The fixed part is secured to the seat. The angle adjustment plate is mounted on the mounting plate of the retaining member. The pivot member is secured to the angle adjustment plate and the bottom surface of the first folding frame. The first stage DC motors are respectively disposed on the sides of the front end of the seat adjacent to the angle adjusters. The drive rod is connected between the two angle adjusters. In use, the first stage DC motors are actuated to rotate the drive rod and thus drive the angle adjustment plates and the pivot members of the angle adjusters such that the first folding frame is pivoted relative to the seat. Therefore, the legs of a sitter can be stretched and placed on the first folding frame, thereby enhancing comfort and minimizing fatigue.

DETAILED DESCRIPTION OF THE PREFERRED EMBODIMENT

Figure 1:
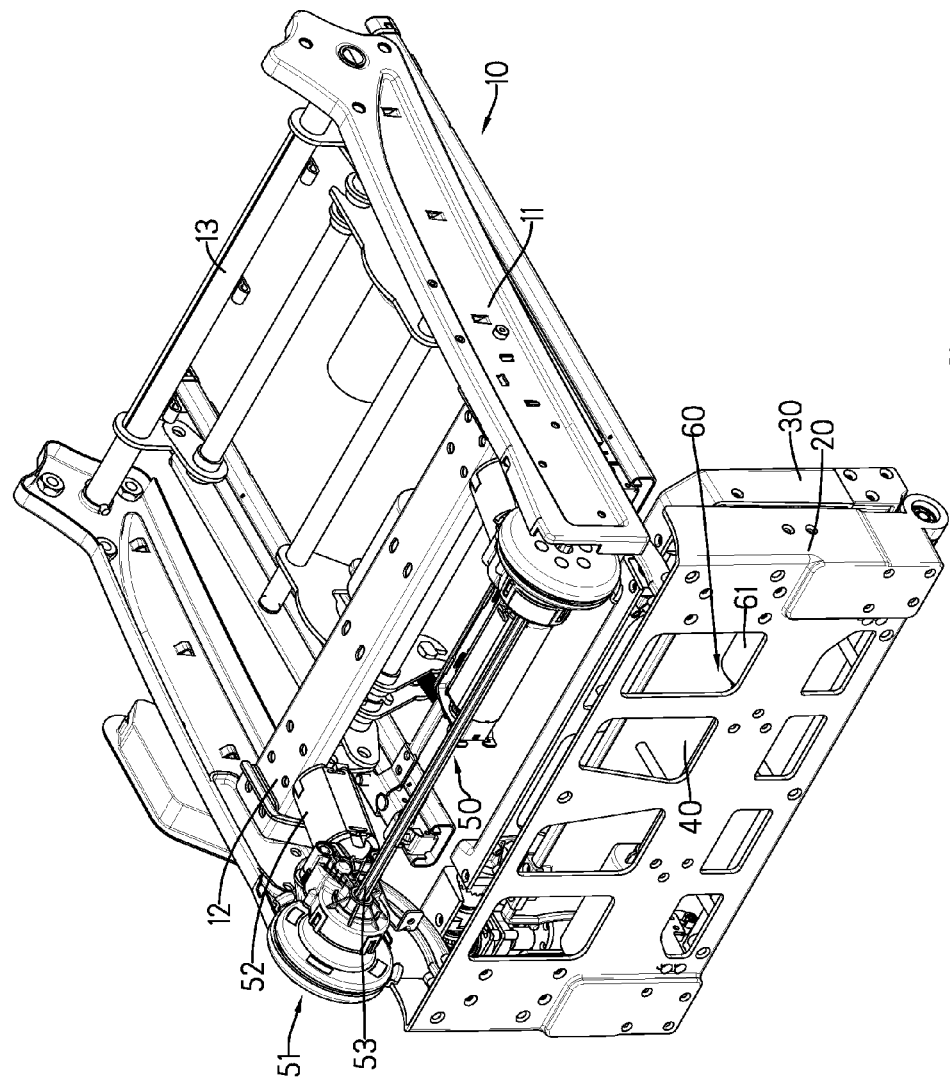
FIG. 1 is a perspective view of a foldable leg rest in accordance with the present invention shown in a folded state.
Figure 2:
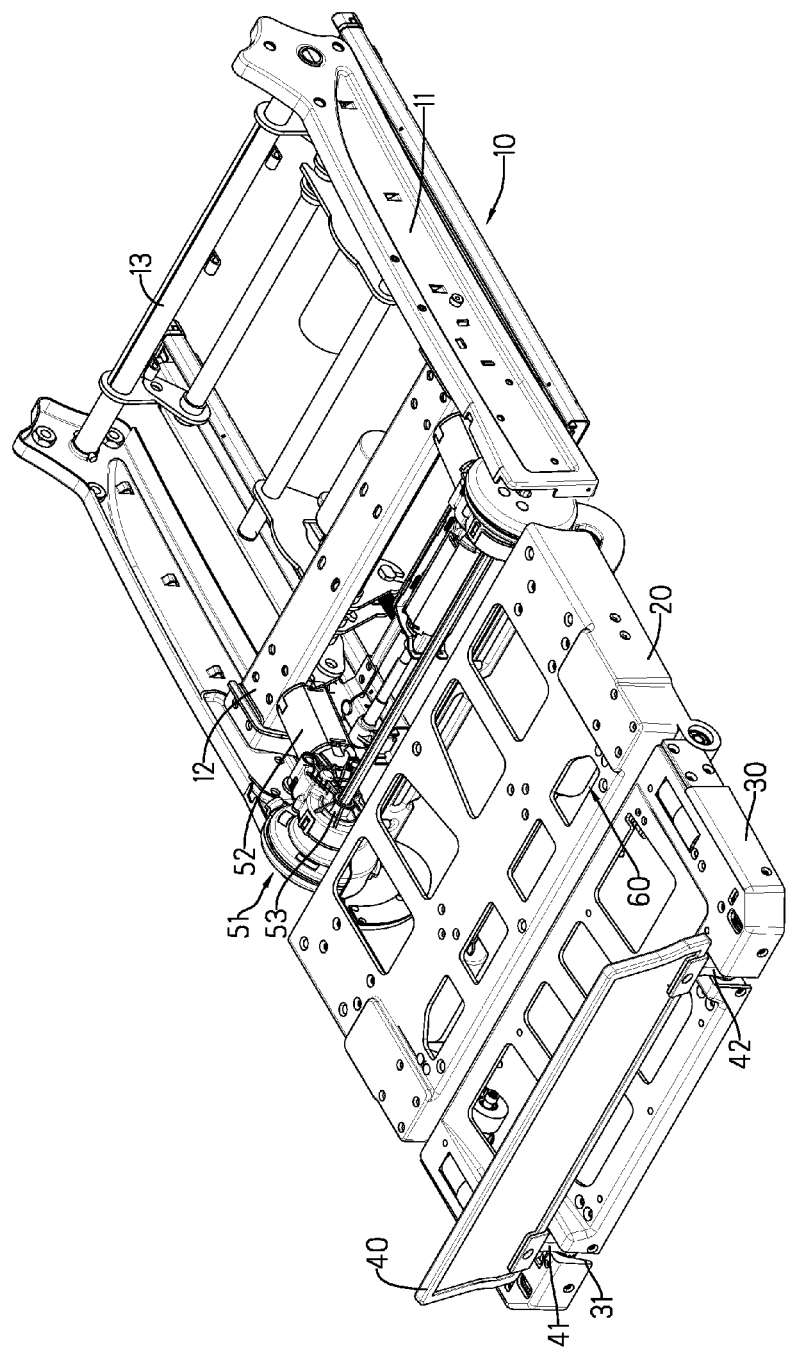
FIG. 2 is a perspective view of a foldable leg rest in accordance with the present invention shown in an unfolded state.
Figure 3:
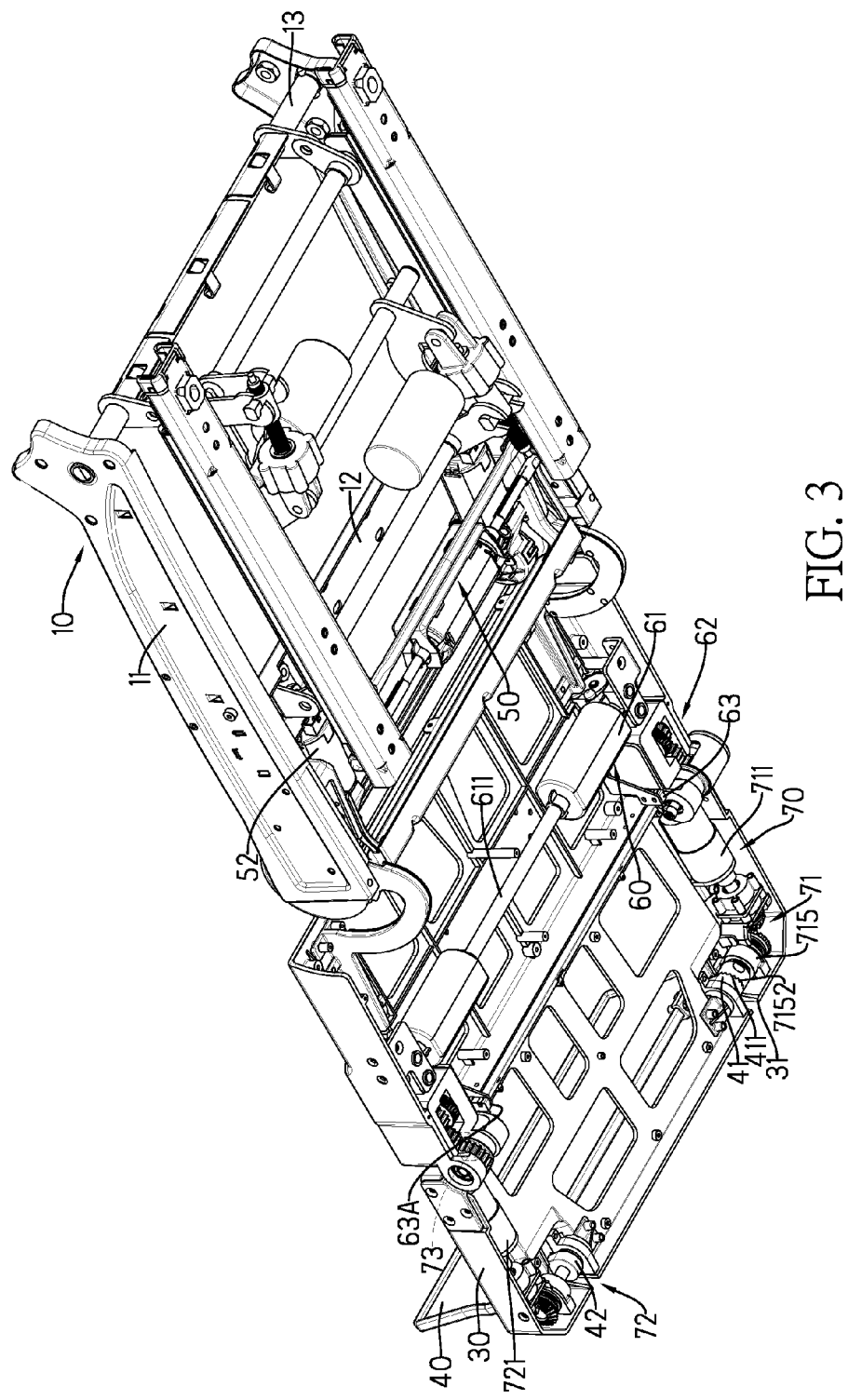
FIG. 3 is another perspective view of the foldable leg rest of FIG. 2.

With reference to FIGS. 1 to 3, a foldable leg rest in accordance with the present invention comprises a seat 10, a first folding frame 20, a second folding frame 30, a footrest 40, a first stage drive mechanism 50, a second stage drive mechanism 60 and a third stage drive mechanism 70.

The seat 10 includes a front end, a rear end, two side panels 11, a support beam 12 and a connecting rod 13. The side panels 11 are parallel to and spaced from each other and each side panel 11 has an inner surface, a front portion and a rear portion. The support beam 12 has two opposite sides respectively secured to the front portions of the side panels 11. The connecting rod 13 has two opposite ends respectively secured to the rear portions of the side panels 11. The above described structure of the seat 10 is conventional, and thus a detailed description thereof is omitted.

The first folding frame 20 includes a front end, a rear end and a bottom surface. Two opposite sides of the rear end of the first folding frame 20 are pivotally connected to two opposite sides of the front end of the seat 10 by the first stage drive mechanism 50.

The second folding frame 30 includes a front end, a rear end, a top surface, a bottom surface and two recesses 31. Two opposite sides of the rear end of the second folding frame 30 are pivotally connected to two opposite sides of the front end of the first folding frame 20 by the second stage drive mechanism 60. The recesses 31 are formed in two opposite sides of the front end of the second folding frame 30.

The footrest 40 includes a bottom end, a first pivot element 41 and a second pivot element 42. The first pivot element 41 is attached to one of two opposite sides of the bottom end of the footrest 40 and has a side surface with annular teeth 411. The second pivot element 42 is attached to the other side of the bottom end of the footrest 40. The first and second pivot elements 41, 42 are received in the recesses 31 of the second folding frame 30 and are pivotally connected to the second folding frame 30 by the third stage drive mechanism 70.

Figure 4:
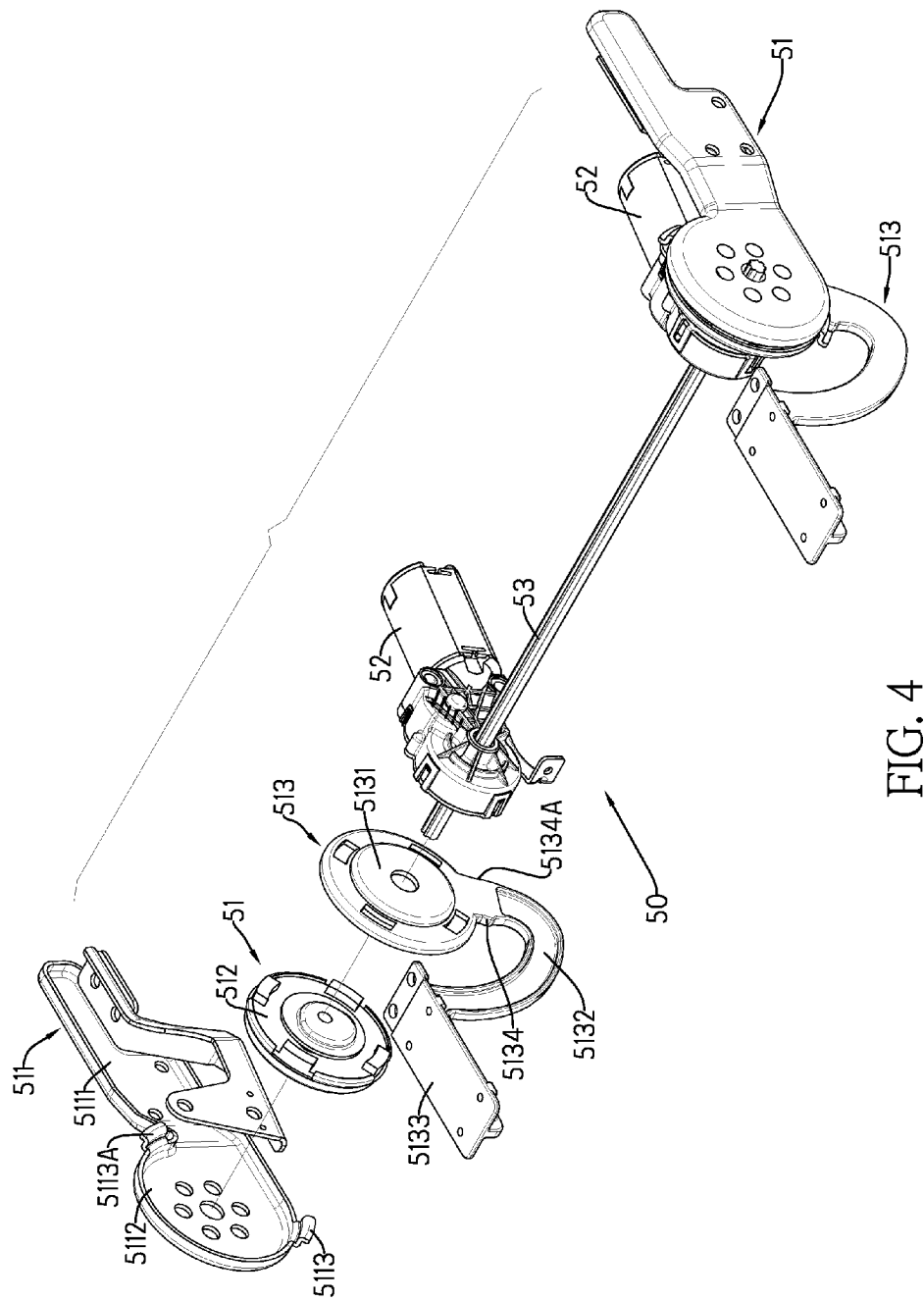
FIG. 4 is an enlarged exploded perspective view of a first stage drive mechanism of the foldable leg rest of FIG. 2.

With reference to FIGS. 2 and 4, the first stage drive mechanism 50 is mounted between the seat 10 and the first folding frame 20 and includes two angle adjusters 51, two first stage DC motors 52 and a drive rod 53.

Each of the angle adjusters 51 is disposed between one of the sides of the front end of the seat 10 and one of the sides of the rear end of the first folding frame 20. Each angle adjuster 51 has a retaining member 511, an angle adjustment plate 512 and a pivot member 513. The retaining member 511 has a fixed part 5111 and a mounting plate 5112. The fixed part 5111 is secured to the inner surface of the side panel 11 of the seat 10. The mounting plate 5112 has an inner surface, a periphery, a first stage unfolded stop 5113 and a first stage folded stop 5113A. The first stage unfolded stop 5113 and the first stage folded stop 5113A extend inwardly from the periphery of the mounting plate 5112 and are spaced from each other. The angle adjustment plate 512 is mounted on the inner surface of the mounting plate 5112 of the retaining member 511. The pivot member 513 has a connecting plate 5131, a curved panel 5132 and a connecting panel 5133. The connecting plate 5131 is secured to an inner surface of the angle adjustment plate 512. The curved panel 5132 has a first end, a second end, a first stage unfolded abutment surface 5134 and a first stage folded abutment surface 5134A. The first end of the curved panel 5132 is attached to a periphery of the connecting plate 5131 and the second end of the curved panel 5132 is attached to a downward facing surface of the connecting panel 5133. The first stage unfolded abutment surface 5134 and the first stage folded abutment surface 5134A are defined on opposite sides of the first end of the curved panel 5132. The first stage unfolded abutment surface 5134 selectively abuts the first stage unfolded stop 5113 of the mounting plate 5112 of the retaining member 511 and the first stage folded abutment surface 5134A selectively abuts the first stage folded stop 5113A of the mounting plate 5112 of the retaining member 511. The connecting panel 5133 is secured to a rear portion of the bottom surface of the first folding frame 20. The first stage DC motors 52 are respectively disposed on the sides of the front end of the seat 10 adjacent to the angle adjusters 51. Each first stage DC motor 52 is secured to an inner surface of the fixed part 5111 of the retaining member 511 of a corresponding angle adjuster 51. The drive rod 53 is connected between the two angle adjusters 51. The first stage DC motors 52 are actuated to rotate the drive rod 53 and thus drive the angle adjustment plates 512 and the pivot members 513 of the angle adjusters 51. The structure and operation of the angle adjustment plate 512 is the same as that of the angle adjustment plate of the conventional angle adjuster that is used to adjust the angle of a backrest, and thus a detailed description thereof is omitted.

Figure 5:
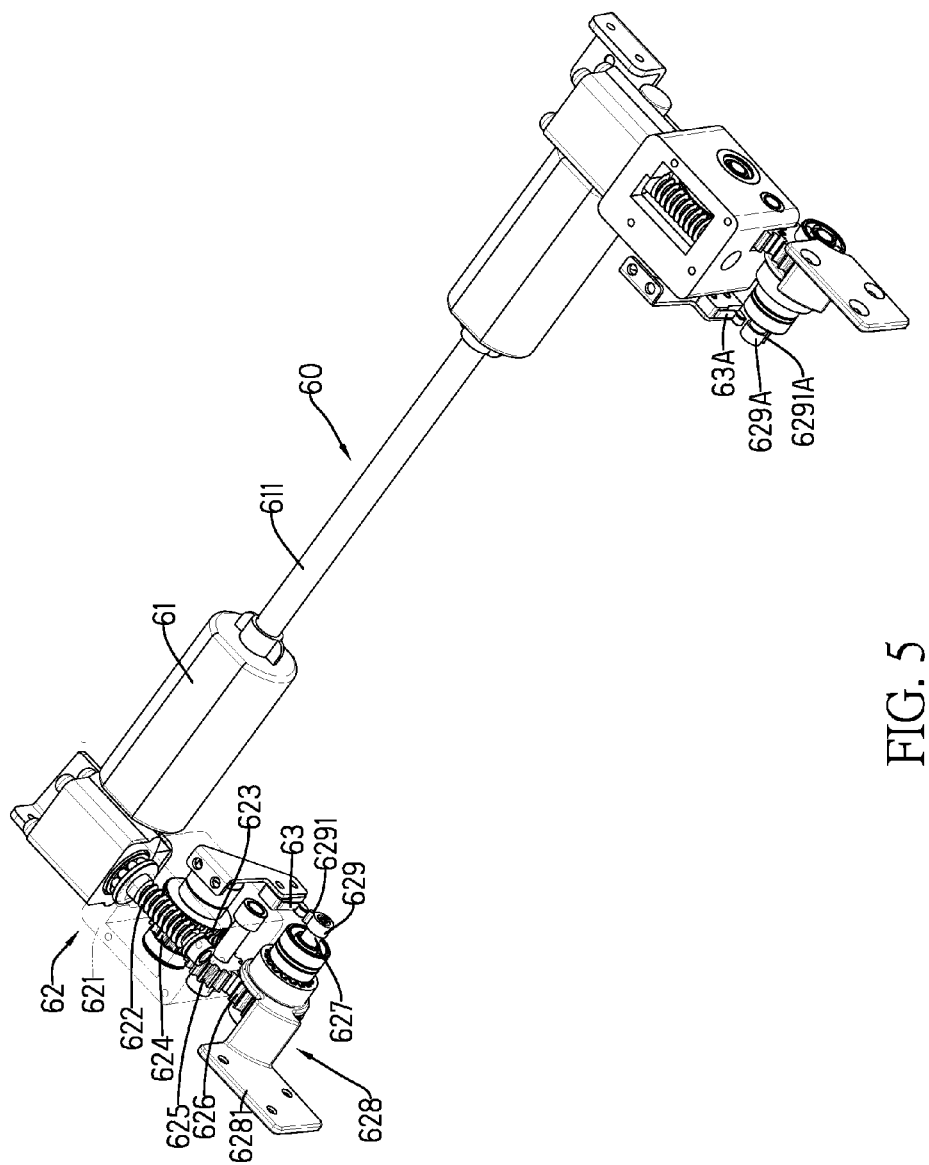
FIG. 5 is an enlarged perspective view of a second stage drive mechanism of the foldable leg rest of FIG. 2.

With reference to FIGS. 3 and 5, the second stage drive mechanism 60 is mounted between the first folding frame 20 and the second folding frame 30 and includes two second stage DC motors 61, two gearings 62, a second stage unfolded contact switch 63 and a second stage folded contact switch 63A.

The second stage DC motors 61 are respectively secured to two opposite sides of a middle portion of the bottom surface of the first folding frame 20. A transmission flexible shaft 611 has two opposite ends respectively connected to the second stage DC motors 61. Each of the gearings 62 is disposed between one of the sides of the front end of the first folding frame 20 and one of the sides of the rear end of the second folding frame 30, and the gearings 62 are adjacent to the second stage DC motors 61. Each gearing 62 has a mounting bracket 621, a worm 622, a worm gear 623, a first gear 624, a second gear 625, a third gear 626, a shaft 627 and a connecting member 628. The mounting bracket 621 is secured to the bottom surface of the first folding frame 20. The worm 622, the worm gear 623, the first gear 624 and the second gear 625 are rotatably mounted in the mounting bracket 621. The third gear 626, the shaft 627 and the connecting member 628 are rotatably mounted outside the mounting bracket 621. The worm 622 is driven by the second stage DC motors 61. The worm gear 623 meshes with the worm 622. The first gear 624 is coaxially mounted on the worm gear 623. The second gear 625 meshes with the first gear 624. The third gear 626 meshes with the second gear 625. The shaft 627 is coaxially mounted through the third gear 626. The connecting member 628 is secured to the shaft 627 and has a connecting piece 6281 extending from the connecting member 628. The connecting piece 6281 is secured to a corresponding side of the second folding frame 30. The shaft 627 has an inner end extending from an inner surface of the third gear 626. A second stage unfolded contact member 629 and a second stage folded contact member 629A are respectively secured to the inner ends of the shafts 627 of the two gearings 62. The second stage unfolded contact member 629 has a contact projection 6291 extending therefrom. The second stage folded contact member 629A has a contact projection 6291A extending therefrom.

The second stage unfolded contact switch 63 and the second stage folded contact switch 63A are respectively secured to two opposite sides of a front portion of the bottom surface of the first folding frame 20. The second stage unfolded contact switch 63 is adjacent to the second stage unfolded contact member 629 such that the contact projection 6291 of the second stage unfolded contact member 629 is contactable with the second stage unfolded contact switch 63. The second stage folded contact switch 63A is adjacent to the second stage folded contact member 629A such that the contact projection 6291A of the second stage folded contact member 629A is contactable with the second stage folded contact switch 63A.

Figure 6:
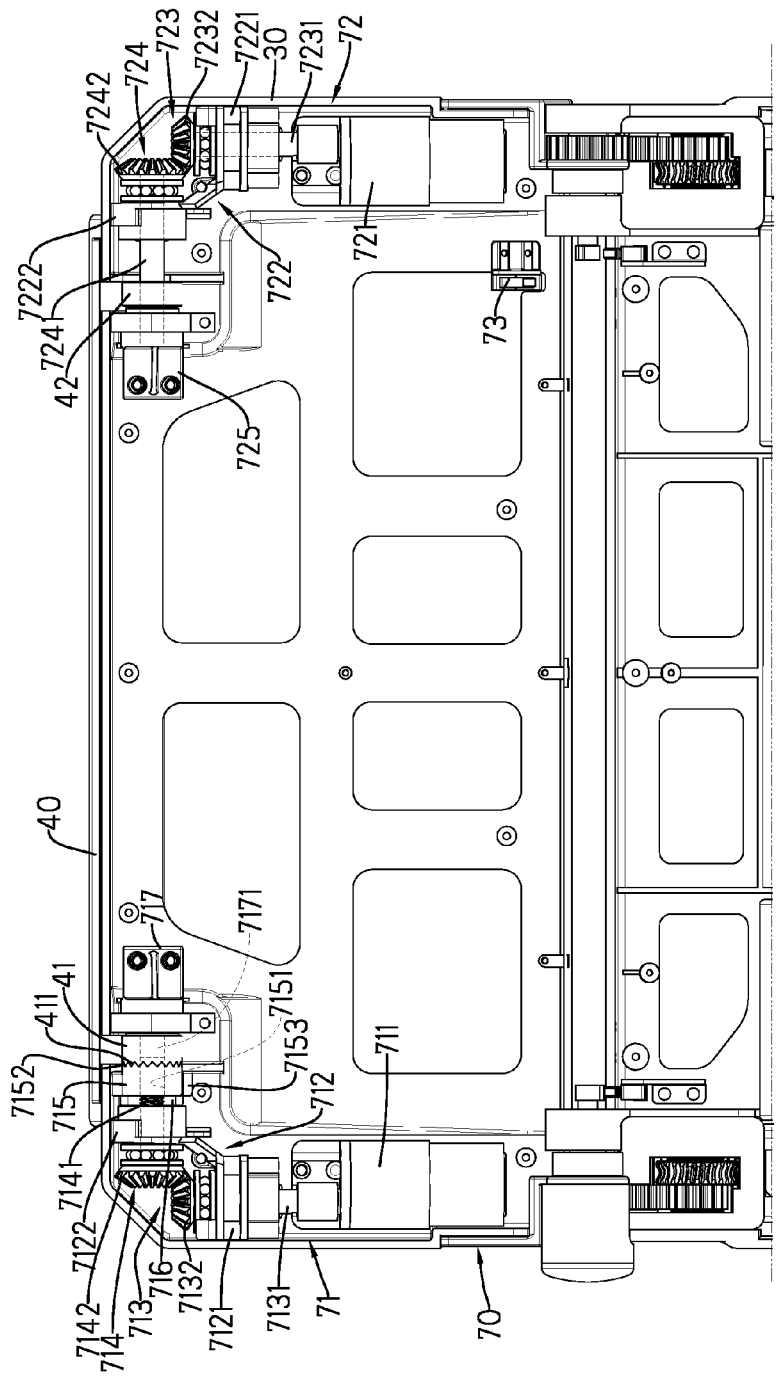
FIG. 6 is a partially enlarged bottom view of the foldable leg rest of FIG. 2.
Figure 7:
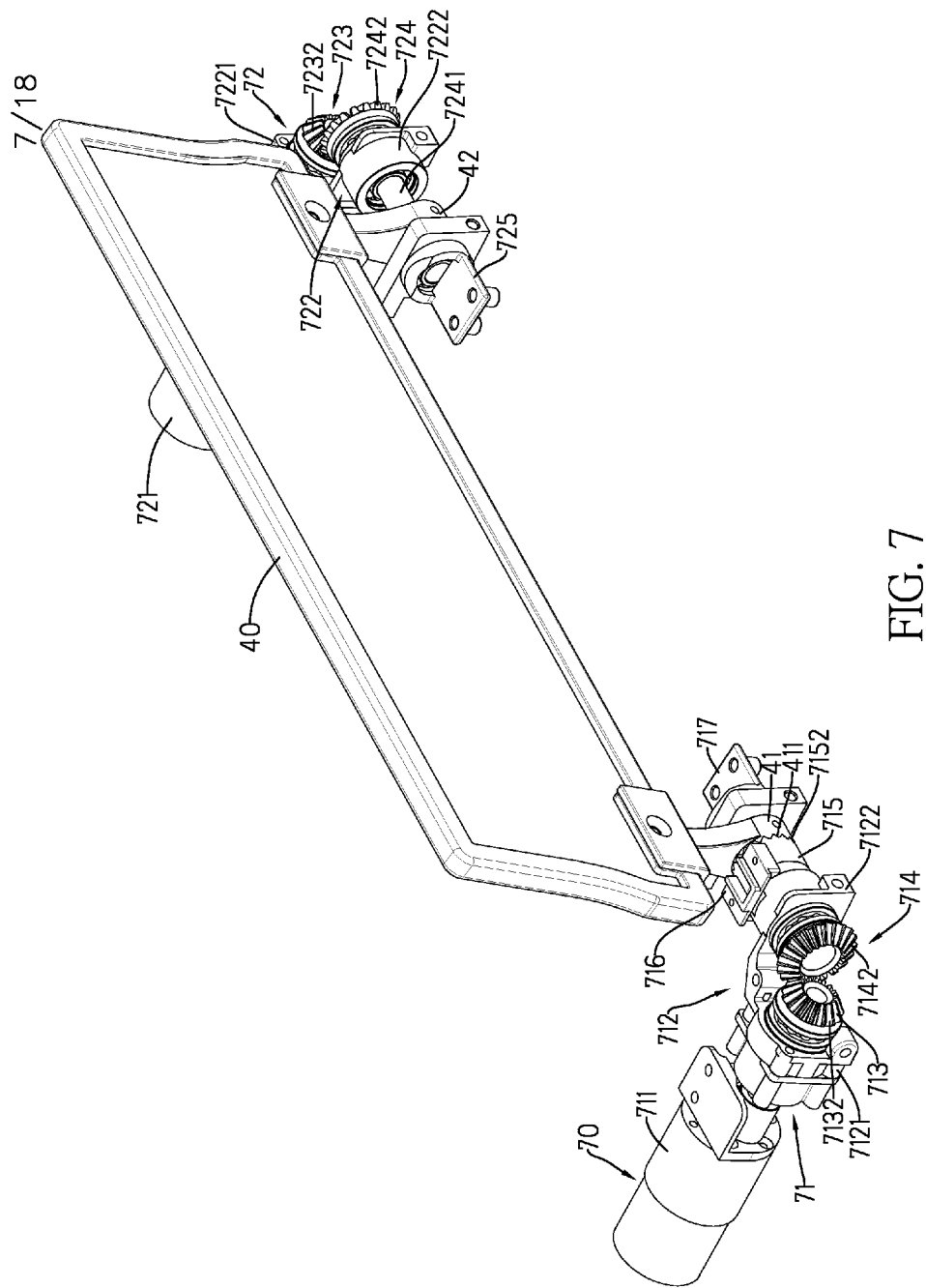
FIG. 7 is an enlarged perspective view of a footrest and a third stage drive mechanism of the foldable leg rest of FIG. 2.
Figure 8:
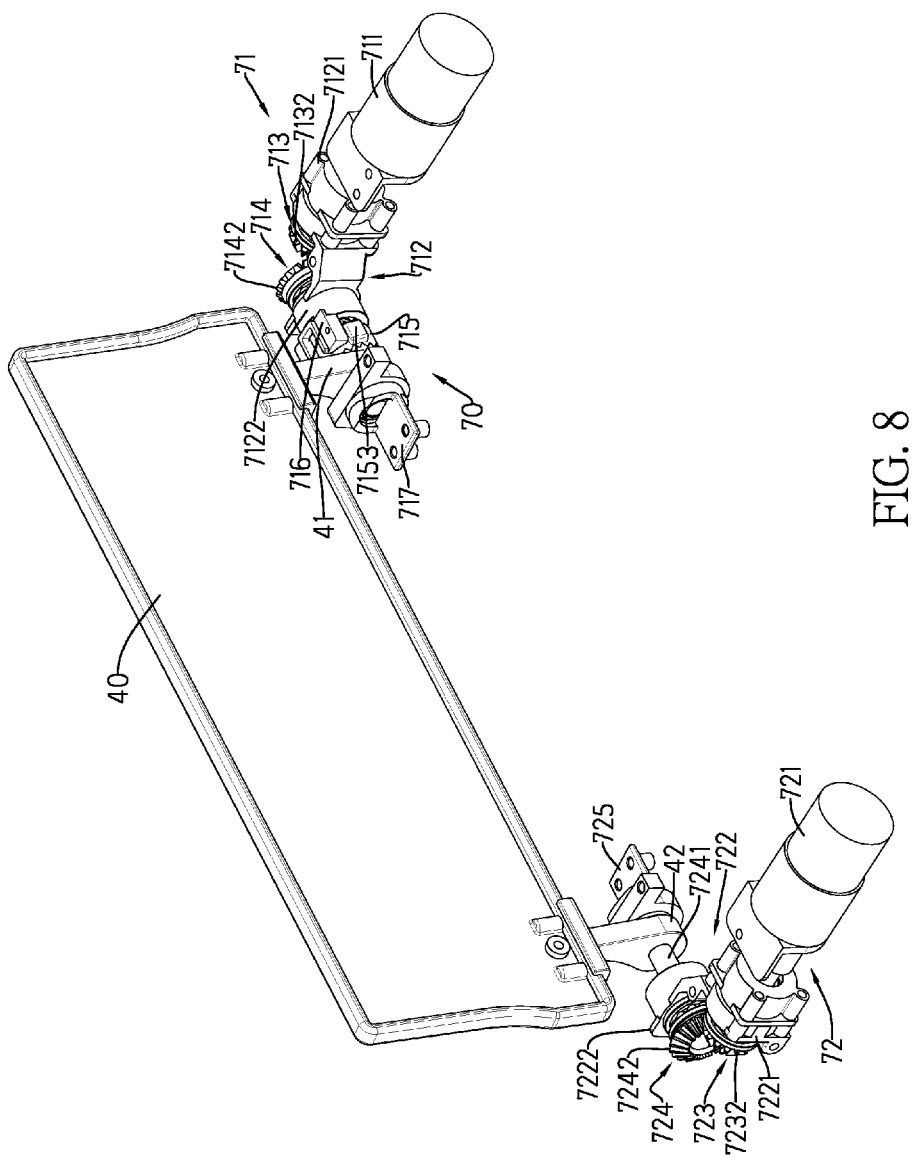
FIG. 8 is another enlarged perspective view of the footrest and the third stage drive mechanism of the foldable leg rest of FIG. 2.

With reference to FIGS. 6 to 8, the third stage drive mechanism 70 is mounted between the second folding frame 30 and the footrest 40 and includes a clutch assembly 71, a transmission assembly 72 and a third stage folded contact switch 73.

The clutch assembly 71 is disposed on one of two opposite sides of the second folding frame 30 and has a third stage clutch DC motor 711, a clutch mount 712, a clutch driving member 713, a clutch driven member 714, a clutch member 715, a stop member 716 and a clutch retainer 717. The third stage clutch DC motor 711 is secured to a rear portion of the bottom surface of the second folding frame 30. The clutch mount 712 is secured to a front portion of the bottom surface of the second folding frame 30. The clutch mount 712 has a first mounting portion 7121 and a second mounting portion 7122 which are perpendicular to each other. The clutch driving member 713 has a clutch driving shaft 7131 and a clutch driving straight bevel gear 7132 mounted on the clutch driving shaft 7131. The clutch driving shaft 7131 is disposed through the first mounting portion 7121 of the clutch mount 712. The clutch driving shaft 7131 has an end portion extending from the first mounting portion 7121 and being adjacent to the third stage clutch DC motor 711. The third stage clutch DC motor 711 is actuated to rotate the clutch driving shaft 7131 as well as the clutch driving straight bevel gear 7132.

The clutch driven member 714 has a clutch driven shaft 7141 and a clutch driven straight bevel gear 7142 mounted on the clutch driven shaft 7141. The clutch driven shaft 7141 is disposed through the second mounting portion 7122 of the clutch mount 712. The clutch driven shaft 7141 has an end portion extending from the second mounting portion 7122 and provided with an external thread. The clutch driven straight bevel gear 7142 of the clutch driven member 714 meshes with the clutch driving straight bevel gear 7132 of the clutch driving member 713. The clutch member 715 has a threaded hole 7151, a side surface, an outer surface and a step 7153. The threaded hole 7151 is configured to receive the externally threaded end portion of the clutch driven shaft 7141 of the clutch driven member 714. The side surface of the clutch member 715 does not face the second mounting portion 7122 of the clutch mount 712 and is provided with annular teeth 7152. The step 7153 is formed on the outer surface of the clutch member 715. The stop member 716 is secured to the bottom surface of the second folding frame 30 adjacent to the outer surface of the clutch member 715. The step 7153 of the clutch member 715 selectively abuts the stop member 716 such that the clutch member 715 does not rotate with the clutch driven shaft 7141 but is longitudinally movable relative to the clutch driven shaft 7141. The clutch retainer 717 is secured to the bottom surface of the second folding frame 30 adjacent to the annular teeth 7152 of the clutch member 715. A rotatable shaft 7171 extends from the clutch retainer 717 toward the annular teeth 7152 of the clutch member 715. The first pivot element 41 of the footrest 40 is secured to the rotatable shaft 7171 such that the annular teeth 7152 of the clutch member 715 are engageable with the annular teeth 411 of the first pivot element 41.

The transmission assembly 72 is disposed on the other side of the second folding frame 30 and has a third stage transmission DC motor 721, a transmission mount 722, a transmission driving member 723, a transmission driven member 724 and a transmission retainer 725. The third stage transmission DC motor 721 is secured to the rear portion of the bottom surface of the second folding frame 30. The transmission mount 722 is secured to the front portion of the bottom surface of the second folding frame 30. The transmission mount 722 has a first mounting portion 7221 and a second mounting portion 7222 which are perpendicular to each other. The transmission driving member 723 has a transmission driving shaft 7231 and a transmission driving straight bevel gear 7232 mounted on the transmission driving shaft 7231. The transmission driving shaft 7231 is disposed through the first mounting portion 7221 of the transmission mount 722. The transmission driving shaft 7231 has an end portion extending from the first mounting portion 7221 and being adjacent to the third stage transmission DC motor 721. The third stage transmission DC motor 721 is actuated to rotate the transmission driving shaft 7231 as well as the transmission driving straight bevel gear 7232.

The transmission driven member 724 has a transmission driven shaft 7241 and a transmission driven straight bevel gear 7242 mounted on the transmission driven shaft 7241. The transmission driven shaft 7241 is disposed through the second mounting portion 7222 of the transmission mount 722 and has an end portion extending from the second mounting portion 7222. The transmission driven straight bevel gear 7242 of the transmission driven member 724 meshes with the transmission driving straight bevel gear 7232 of the transmission driving member 723. The transmission retainer 725 is secured to the bottom surface of the second folding frame 30. An end of the end portion of the transmission driven shaft 7241 of the transmission driven member 724 is rotatably mounted in the transmission retainer 725. The second pivot element 42 of the footrest 40 is secured to a middle portion of the transmission driven shaft 7241 between the transmission mount 722 and the transmission retainer 725.

Figure 13:
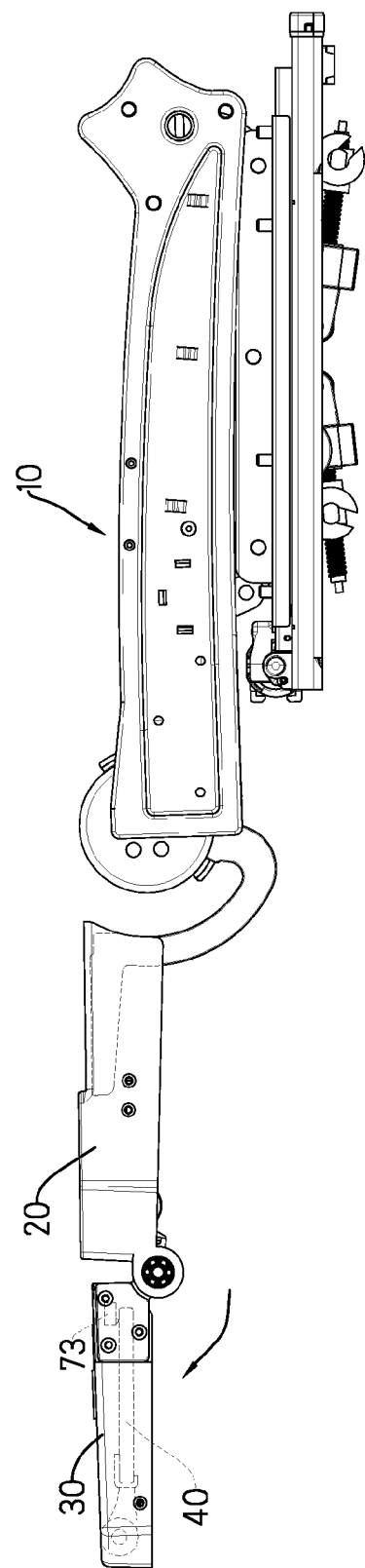

The third stage folded contact switch 73 is secured to the rear portion of the bottom surface of the second folding frame 30. The footrest 40 can be folded toward the bottom surface of the second folding frame 30 to contact the third stage folded contact switch 73 as shown in FIG. 13.

Figure 9:
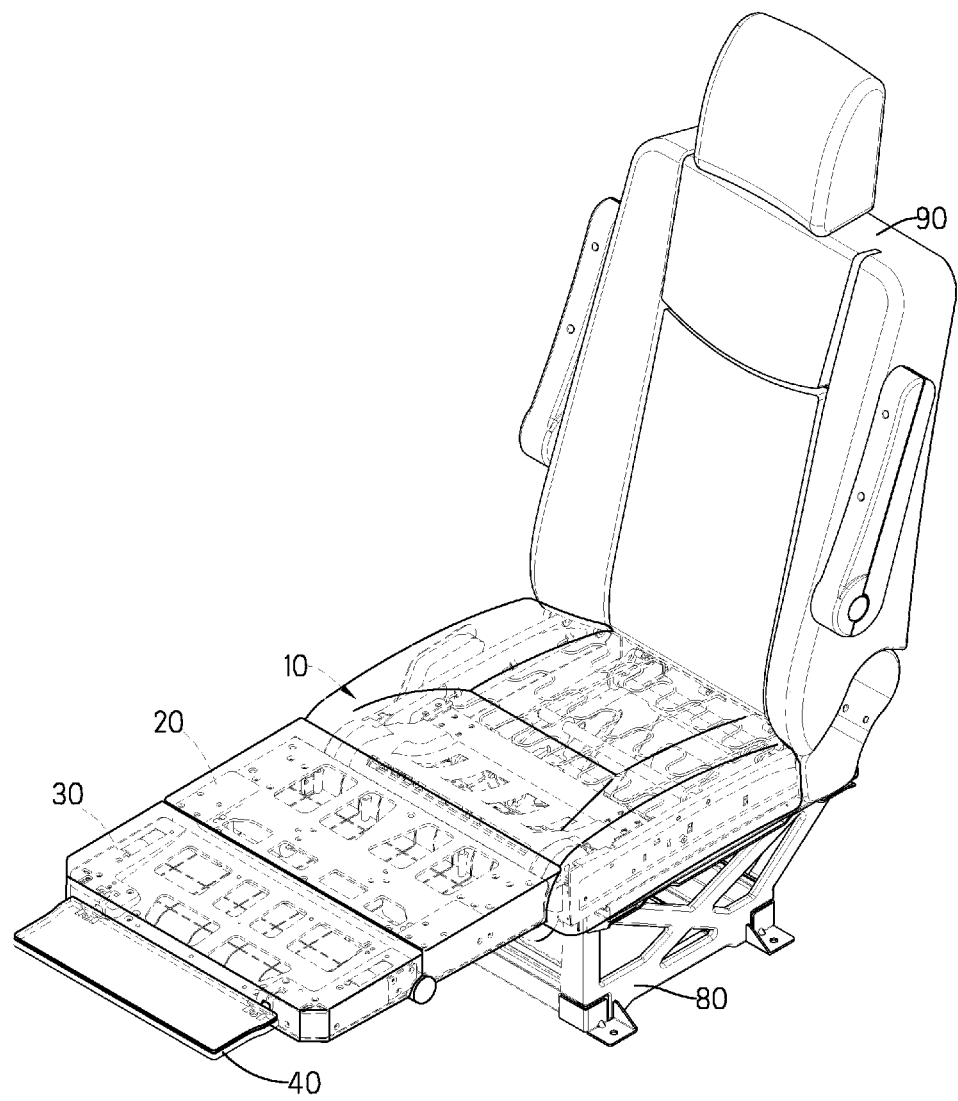
FIG. 9 is a perspective view of a chair with the foldable leg rest in accordance with the present invention.
Figure 10:
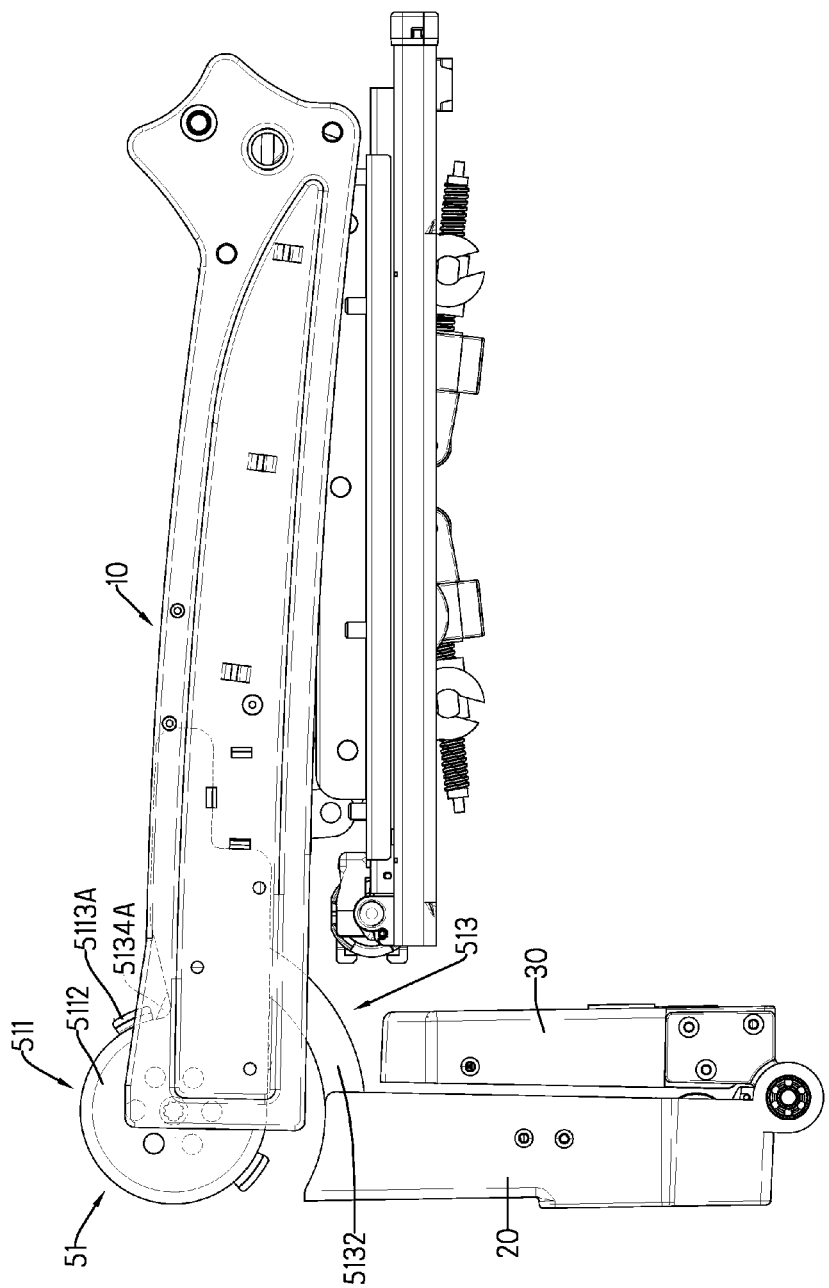
FIG. 10 is a side view of the foldable leg rest in accordance with the present invention showing that the foldable leg rest is in a non-actuated state.
Figure 11:
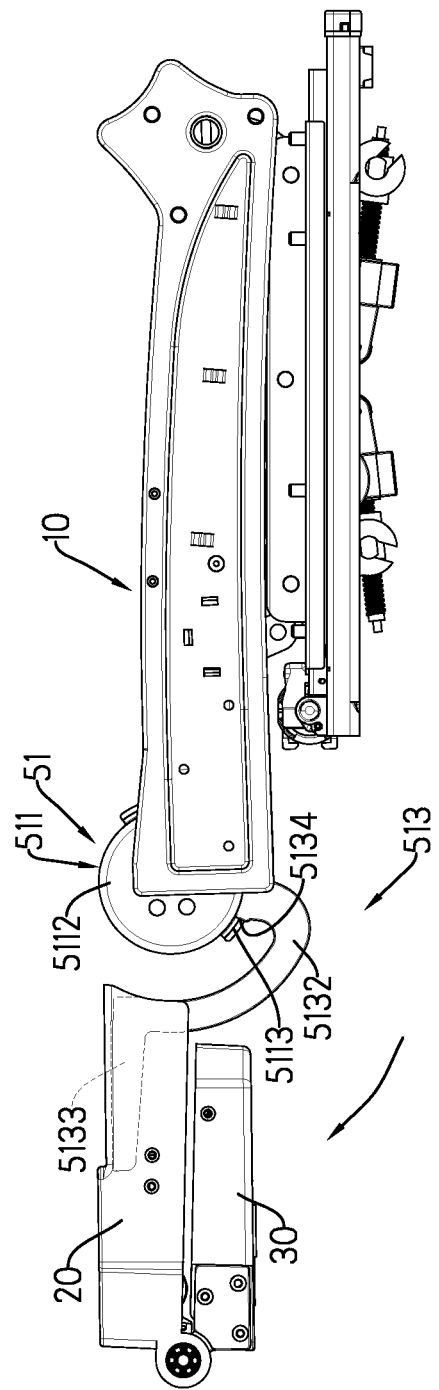
FIGS. 11 to 16 are side views of the foldable leg rest in accordance with the present invention showing that the foldable leg rest is in an actuated state.

With reference to FIG. 9, the foldable leg rest in accordance with the present invention is applied to a chair that comprises a seat base 80 and a backrest 90. The seat 10 is mounted on the seat base 80. The backrest 90 is pivotally connected to the rear end of the seat 10. With reference to FIG. 10, the leg rest is in a folded state. To unfold the leg rest, with reference to FIGS. 4 and 11, the first stage DC motors 52 are actuated to rotate the drive rod 53 such that the first folding frame 20 can be pivoted forward relative to the seat 10 with the transmission of the angle adjustment plates 512 and the pivot members 513 of the angle adjusters 51. As the first folding frame 20 is pivoted forward 90 degrees relative to the seat 10, the first stage unfolded abutment surfaces 5134 of the curved panels 5132 of the pivot members 513 abut the first stage unfolded stops 5113 of the mounting plates 5112 of the retaining members 511. Under this circumstance, the first stage DC motors 52 cannot drive the first folding frame 20 such that the load currents of the first stage DC motors 52 increase. A controller is adapted to read the current value of the first stage DC motors 52. The first stage DC motors 52 are controlled to stop when the current value of the first stage DC motors 52 reaches the current set point. Thus, the first folding frame 20 completes 90 degrees of forward pivoting to be positioned in a horizontal plane.

Figure 12:
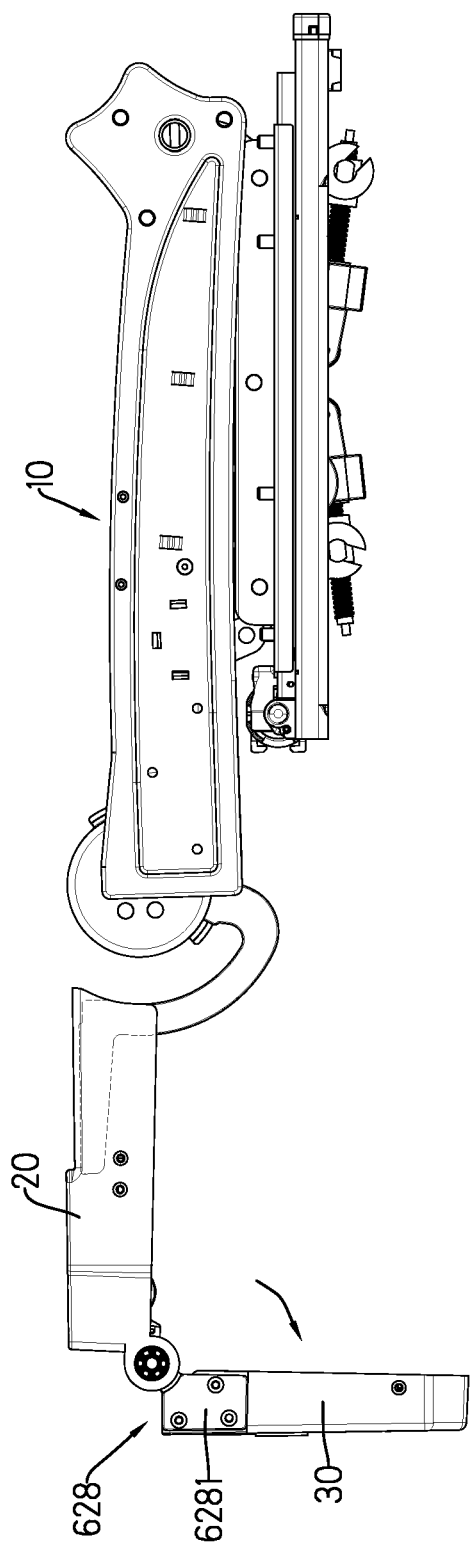

With reference to FIGS. 5 and 12, the second stage DC motors 61 are actuated to rotate the worms 622 such that the second folding frame 30 can be pivoted forward relative to the first folding frame 20 with the transmission of the worm gears 623, the first gears 624, the second gears 625, the third gears 626, the shafts 627 and the connecting members 628. While the second folding frame 30 is being pivoted, the second stage unfolded contact member 629 and the second stage folded contact member 629A secured to the shafts 627 are also rotated. With further reference to FIG. 13, as the second folding frame 30 is pivoted forward 180 degrees relative to the first folding frame 20, the contact projection 6291 of the second stage unfolded contact member 629 contacts the second stage unfolded contact switch 63 and the contact projection 6291A of the second stage folded contact member 629A does not contact the second stage folded contact switch 63A. Thus, the second-stage DC motors 61 can be controlled to stop and the second folding frame 30 completes 180 degrees of pivoting to be positioned in a horizontal plane.

Figure 14:
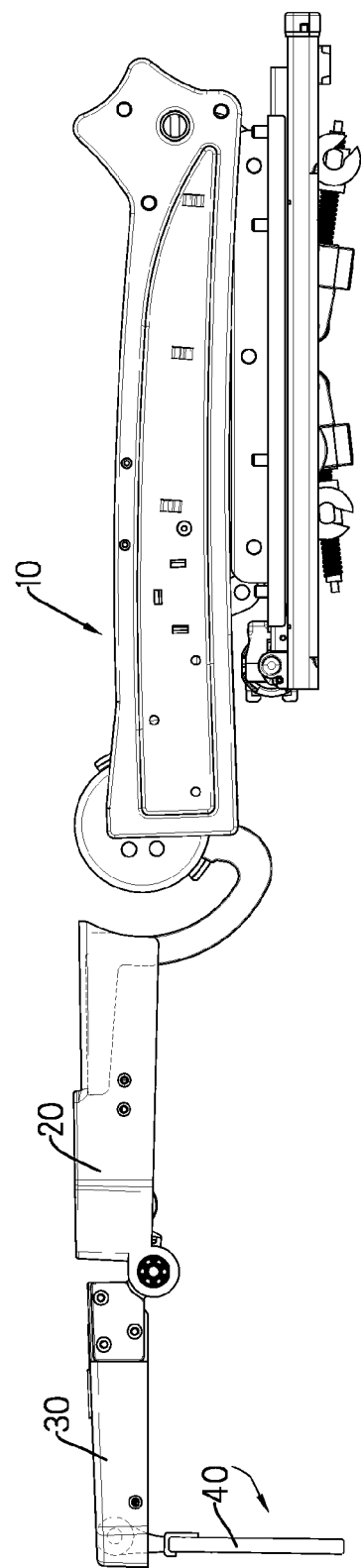
Figure 15:
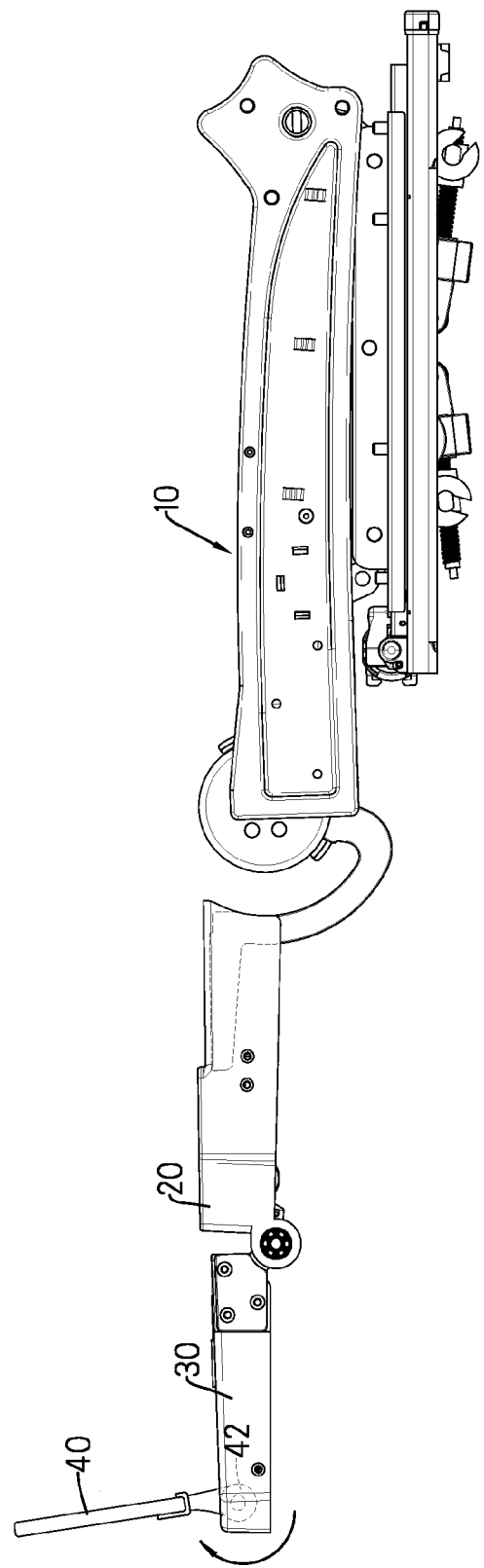
Figure 17:
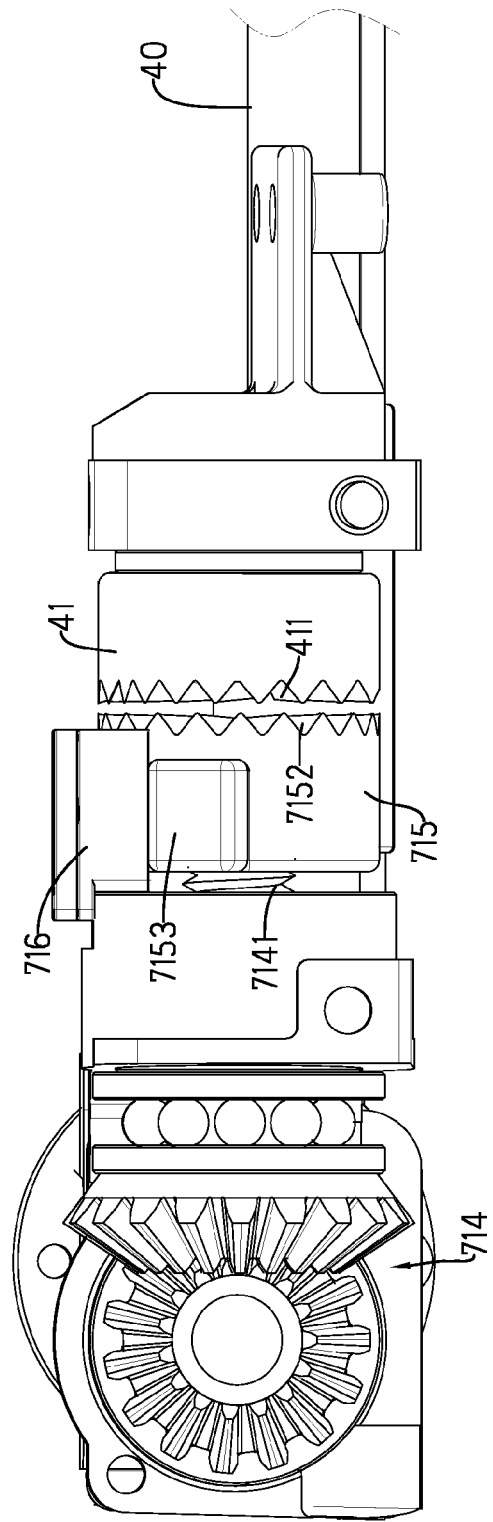
FIG. 17 is a front view of a clutch assembly of the third stage drive mechanism of the foldable leg rest of FIG. 13.

With reference to FIG. 7, the third stage clutch DC motor 711 is actuated to rotate the clutch driving member 713 and thus rotate the clutch driven member 714 and the clutch member 715. With reference to FIG. 17, the clutch member 715 rotates with the clutch driven member 714 until the step 7153 of the clutch member 715 abuts the stop member 716. The clutch member 715 then begins to move along the clutch driven shaft 7141 of the clutch driven member 714 away from the first pivot element 41 of the footrest 40 such that the annular teeth 7152 of the clutch member 715 disengage the annular teeth 411 of the first pivot element 41. With reference to FIGS. 8 and 14, the third stage transmission DC motor 721 is actuated to rotate the transmission driving member 723 and thus rotate the transmission driven member 724 such that the footrest 40 can be pivoted toward the top surface of the second folding frame 30. With reference to FIGS. 2 and 15, as the footrest 40 is pivoted 260 degrees relative to the second folding frame 30, that is, as the footrest 40 is inclined 80 degrees relative to a horizontal plane, the first and second pivot elements 41, 42 of the footrest 40 abut rear surfaces of the recesses 31 of the second folding frame 30. Under this circumstance, the third stage transmission DC motor 721 cannot drive the footrest 40 such that the load current of the third stage transmission DC motor 721 increases. A controller is adapted to read the current value of the third stage transmission DC motor 721. The third stage transmission DC motor 721 is controlled to stop when the current value of the third stage transmission DC motor 721 reaches the current set point. Thus, the footrest 40 completes 260 degrees of pivoting to be inclined 80 degrees relative to a horizontal plane.

Figure 18:
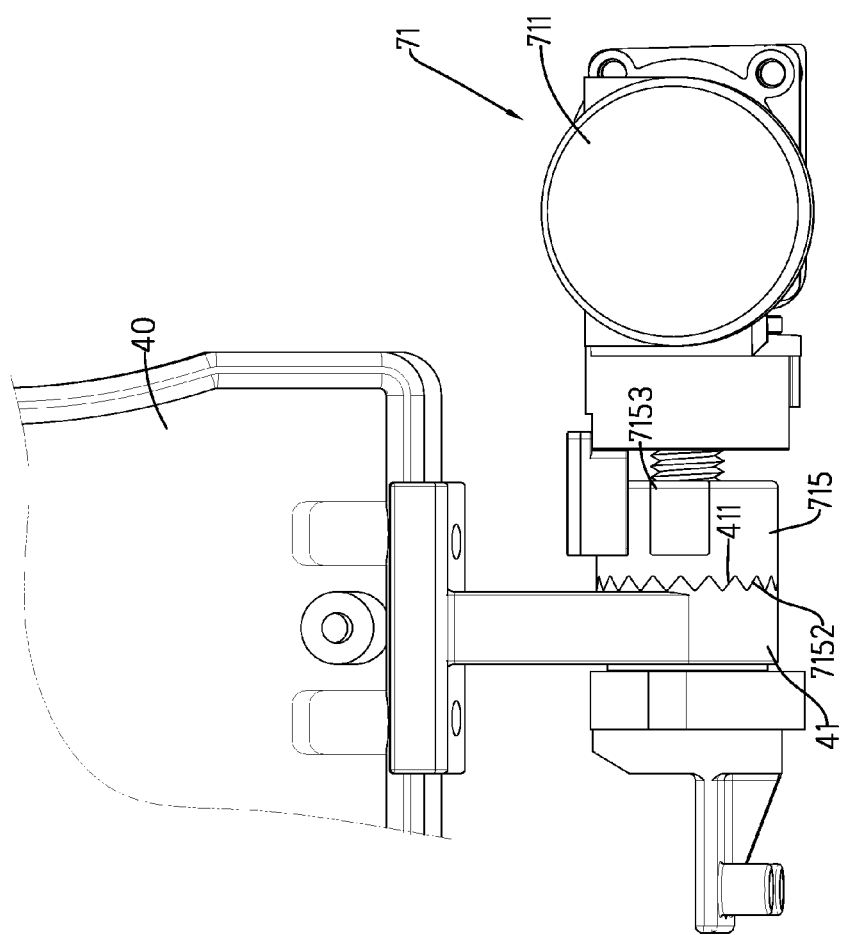
FIG. 18 is a rear view of the clutch assembly of the third stage drive mechanism of the foldable leg rest of FIG. 15.

With reference to FIG. 18, when the controller detects that the third stage transmission DC motor 721 stops, the third stage clutch DC motor 711 is reactuated to move the clutch member 715 toward the first pivot element 41 of the footrest 40 such that the annular teeth 7152 of the clutch member 715 engage the annular teeth 411 of the first pivot element 41, thereby ensuring proper positioning of the footrest 40 and the second folding frame 30.

Figure 16:
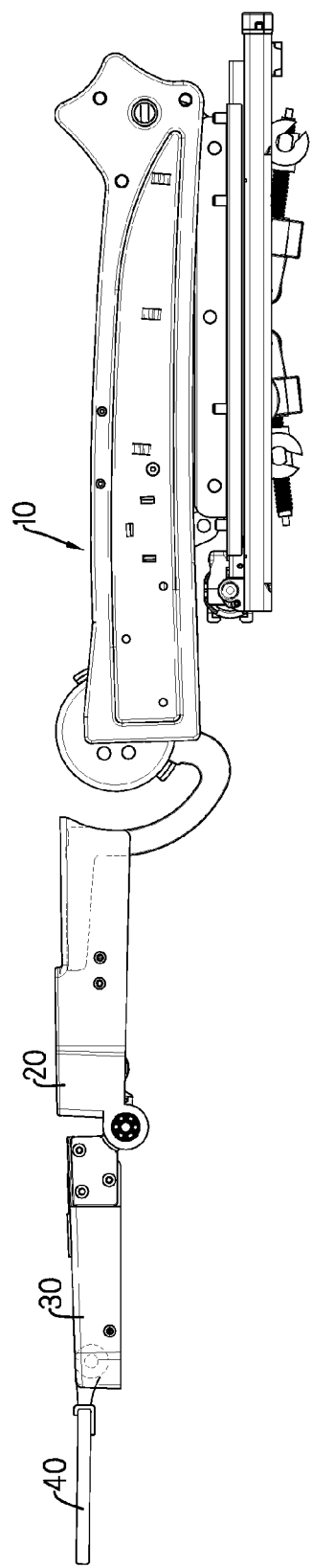

The leg rest in accordance with the present invention includes a three stage folding structure to extend its length. Therefore, the legs of a sitter can be stretched and placed on the first and second folding frames 20, 30 and the feet of the sitter can step onto the footrest 40, thereby enhancing comfort and minimizing fatigue. In addition, the footrest 40 is adjustable in angle relative to the second folding frame 30 to meet different sitters' needs. With reference to FIG. 16, the footrest 40 is adjusted to pivot 180 degrees relative to the second folding frame 30 to be positioned in a horizontal plane, thereby effectively extending the length of the leg rest and satisfying a tall sitter. Moreover, the first stage drive mechanism 50 and the second stage drive mechanism 60 each include two DC motors 52, 61 to provide a high power source to smoothly pivot the first and second folding frames 20, 30.

To fold the leg rest, with reference to FIG. 3, the third stage clutch DC motor 711 is actuated to disengage the annular teeth 7152 of the clutch member 715 from the annular teeth 411 of the first pivot element 41 of the footrest 40. The third stage transmission DC motor 721 is actuated to pivot the footrest 40 toward the bottom surface of the second folding frame 30. The footrest 40 is pivoted until it contacts the third stage folded contact switch 73 on the bottom surface of the second folding frame 30. The third stage clutch DC motor 711 is reactuated to engage the annular teeth 7152 of the clutch member 715 with the annular teeth 411 of the first pivot element 41 of the footrest 40, thereby ensuring that the footrest 40 is positioned on the bottom surface of the second folding frame 30. The second stage DC motors 61 are actuated to pivot the second folding frame 30 toward the bottom surface of the first folding frame 20. With further reference to FIG. 5, the second folding frame 30 is pivoted until the contact projection 6291A of the second stage folded contact member 629A contacts the second stage folded contact switch 63A. The first stage DC motors 52 are actuated to pivot the first folding frame 20 backward. With reference to FIG. 10, the first folding frame 20 is pivoted until the first stage folded abutment surfaces 5134A of the curved panels 5132 of the pivot members 513 of the angle adjusters 51 abut the first stage folded stops 5113A of the mounting plates 5112 of the retaining members 511 of the angle adjusters 51. Thus, the first and second folding frames 20, 30 and the footrest 40 are folded to be perpendicular to the seat 10 such that the area of the leg rest is reduced for convenience in storage and shipment.

What is claimed is:
1. A foldable leg rest comprising:
a seat including a front end;
a first folding frame including a rear end and a bottom surface, and two opposite sides of the rear end of the first folding frame pivotally connected to two opposite sides of the front end of the seat; and
a first stage drive mechanism mounted between the seat and the first folding frame and including:
two angle adjusters, each angle adjuster disposed between one of the sides of the front end of the seat and one of the sides of the rear end of the first folding frame, and each angle adjuster having:
a retaining member having:
a fixed part secured to the seat; and
a mounting plate;
an angle adjustment plate mounted on the mounting plate of the retaining member; and
a pivot member secured to the angle adjustment plate and the bottom surface of the first folding frame;
a drive rod connected between the two angle adjusters; and
two first stage DC motors respectively disposed on the sides of the front end of the seat adjacent to the angle adjusters, and the first stage DC motors actuated to rotate the drive rod and thus drive the angle adjustment plates and the pivot members of the angle adjusters such that the first folding frame can be pivoted relative to the seat.

2. The foldable leg rest as claimed in claim 1, wherein the pivot member of each angle adjuster has
a connecting plate secured to the angle adjustment plate;
a connecting panel secured to the first folding frame; and
a curved panel having:
a first end attached to a periphery of the connecting plate; and
a second end attached to a downward facing surface of the connecting panel.

3. The foldable leg rest as claimed in claim 2, wherein
the mounting plate of the retaining member of each angle adjuster has
a periphery; and
a first stage unfolded stop and a first stage folded stop extending from the periphery of the mounting plate and spaced from each other; and
the curved panel of the pivot member of each angle adjuster has a first stage unfolded abutment surface and a first stage folded abutment surface defined on opposite sides of the first end of the curved panel, and the first stage unfolded abutment surface is able to abut the first stage unfolded stop of the mounting plate of the retaining member and the first stage folded abutment surface selectively abuts the first stage folded stop of the mounting plate of the retaining member.

4. The foldable leg rest as claimed in claim 3 further comprising:
a second folding frame including a rear end, and two opposite sides of the rear end of the second folding frame pivotally connected to two opposite sides of a front end of the first folding frame;
a second stage drive mechanism mounted between the first folding frame and the second folding frame and including:
two gearings, each gearing disposed between one of the sides of the front end of the first folding frame and one of the sides of the rear end of the second folding frame; and
two second stage DC motors respectively secured to opposite sides of the bottom surface of the first folding frame, a transmission flexible shaft having two opposite ends respectively connected to the second stage DC motors, and the second stage DC motors actuated to drive the gearings such that the second folding frame can be pivoted relative to the first folding frame.

5. The foldable leg rest as claimed in claim 4, wherein each gearing has
a mounting bracket secured to the bottom surface of the first folding frame;

a worm, a worm gear, a first gear and a second gear rotatably mounted in the mounting bracket, the worm driven by the second stage DC motors, the worm gear meshing with the worm, the first gear coaxially mounted on the worm gear, and the second gear meshing with the first gear; and a third gear, a shaft and a connecting member rotatably mounted outside the mounting bracket, the third gear meshing with the second gear, the shaft coaxially mounted through the third gear, the connecting member secured to the shaft and having a connecting piece extending from the connecting member, and the connecting piece secured to a corresponding side of the second folding frame.

6. The foldable leg rest as claimed in claim 5, wherein the second stage drive mechanism includes a second stage unfolded contact switch and a second stage folded contact switch secured to the bottom surface of the first folding frame; and a second stage unfolded contact member and a second stage folded contact member are respectively secured to the shafts of the two gearings, the second stage unfolded contact member has a contact projection extending therefrom and being contactable with the second stage unfolded contact switch, and the second stage folded contact member has a contact projection extending therefrom and being contactable with the second stage folded contact switch.

7. The foldable leg rest as claimed in any one of claim 4 further comprising:

a footrest pivotally connected to the second folding frame; and a third stage drive mechanism mounted between the second folding frame and the footrest and including a transmission assembly having a third stage transmission DC motor, a transmission driving member and a transmission driven member, and the third stage transmission DC motor actuated to rotate the transmission driving member and thus rotate the transmission driven member such that the footrest can be pivoted relative to the second folding frame.

8. The foldable leg rest as claimed in claim 7, wherein the footrest includes a second pivot element attached to a bottom end of the footrest;

the transmission assembly has a transmission mount secured to a bottom surface of the second folding frame and having a first mounting portion and a second mounting portion;

the transmission driving member of the transmission assembly has a transmission driving shaft disposed through the first mounting portion of the transmission mount; and a transmission driving straight bevel gear mounted on the transmission driving shaft;

the third stage transmission DC motor of the transmission assembly is secured to the bottom surface of the second folding frame and is actuated to rotate the transmission driving shaft as well as the transmission driving straight bevel gear; and the transmission driven member of the transmission assembly has a transmission driven shaft disposed through the second mounting portion of the transmission mount, and the second pivot element of the footrest secured to the transmission driven shaft; and a transmission driven straight bevel gear mounted on the transmission driven shaft and meshing with the transmission driving straight bevel gear of the transmission driving member.

9. The foldable leg rest as claimed in claim 8, wherein the footrest has a first pivot element attached to the bottom end of the footrest and having a side surface with annular teeth; and the third stage drive mechanism includes a clutch assembly having:

a clutch mount secured to the bottom surface of the second folding frame and having a first mounting portion and a second mounting portion;

a clutch driving member having:

a clutch driving shaft disposed through the first mounting portion of the clutch mount; and a clutch driving straight bevel gear mounted on the clutch driving shaft;

a third stage clutch DC motor secured to the bottom surface of the second folding frame and actuated to rotate the clutch driving shaft as well as the clutch driving straight bevel gear;

a clutch driven member having:

a clutch driven shaft disposed through the second mounting portion of the clutch mount and provided with an external thread; and a clutch driven straight bevel gear mounted on the clutch driven shaft and meshing with the clutch driving straight bevel gear of the clutch driving member;

a clutch member having:

a threaded hole configured to receive the externally threaded clutch driven shaft of the clutch driven member;

a side surface provided with annular teeth being engageable with the annular teeth of the first pivot element of the footrest; and a step formed on an outer surface of the clutch member; and a stop member secured to the bottom surface of the second folding frame adjacent to the clutch member, the step of the clutch member selectively abutting the stop member such that the clutch member does not rotate with the clutch driven shaft but is longitudinally movable relative to the clutch driven shaft.

10. The foldable leg rest as claimed in claim 9, wherein the third stage drive mechanism includes a third stage folded contact switch secured to the bottom surface of the second folding frame; and the footrest is selectively folded toward the bottom surface of the second folding frame to contact the third stage folded contact switch.

11. The foldable leg rest as claimed in any one of claim 5 further comprising:

a footrest pivotally connected to the second folding frame; and a third stage drive mechanism mounted between the second folding frame and the footrest and including a transmission assembly having a third stage transmission DC motor, a transmission driving member and a transmission driven member, and the third stage transmission DC motor actuated to rotate the transmission driving member and thus rotate the transmission driven member such that the footrest can be pivoted relative to the second folding frame.

12. The foldable leg rest as claimed in any one of claim 6 further comprising:

a footrest pivotally connected to the second folding frame; and a third stage drive mechanism mounted between the second folding frame and the footrest and including a transmission assembly having a third stage transmission DC motor, a transmission driving member and a transmission driven member, and the third stage transmission DC motor actuated to rotate the transmission driving member and thus rotate the transmission driven member such that the footrest can be pivoted relative to the second folding frame.

\* \* \* \* \*